Sept. 3, 1946.　　　　E. C. McLEAN　　　　2,407,028
PORTABLE TIMBER CUTTING SAW APPARATUS
Filed Sept. 19, 1945
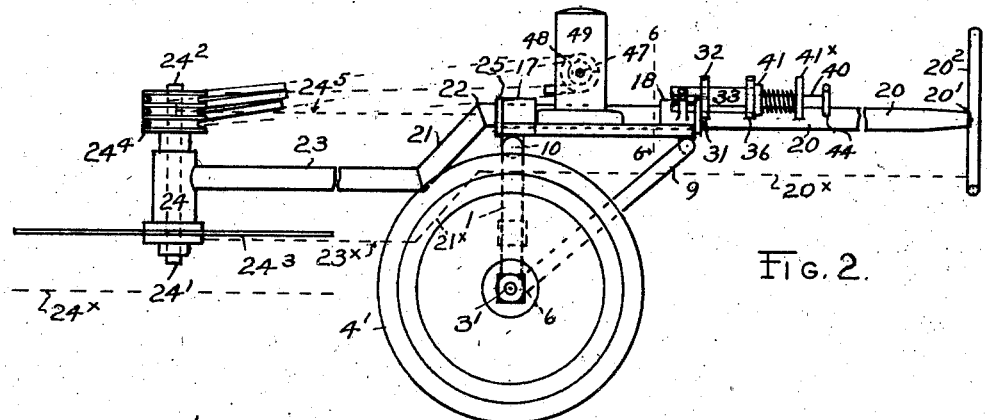
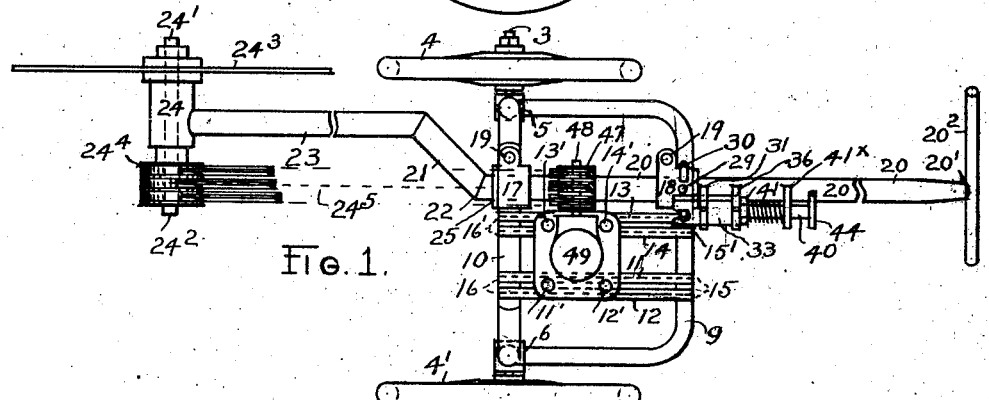
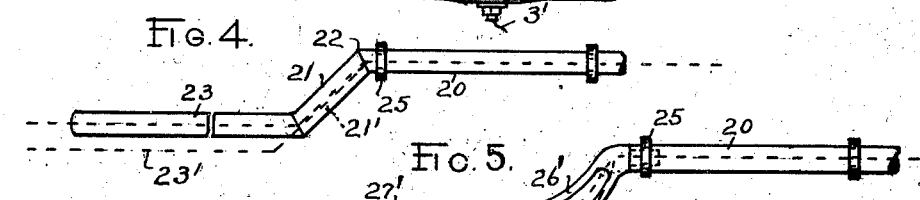
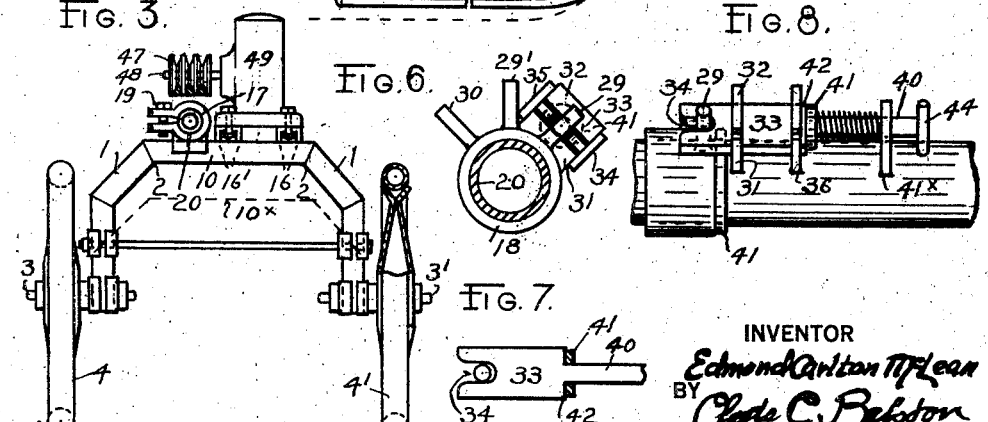
INVENTOR
Edmond Carlton McLean
BY
Clyde C. Belston
ATTORNEY Patented Sept. 3, 1946

2,407,028

UNITED STATES PATENT OFFICE 2,407,028

PORTABLE TIMBER CUTTING SAW APPARATUS

Edmond Carlton McLean, Palatka, Fla.

Application September 19, 1945, Serial No. 617,350

2 Claims. (Cl. 143—43)

My invention pertains to motor equipped portable timber saw apparatus, and particularly to the type for cutting down trees, trimming them and cutting up their boles when felled, into convenient sizes and lengths for timbers, railroad ties, staves, pulp wood, fire wood, etc., and the main objects of my invention are:

To provide a more practical and efficient means whereby the tree bole may be cross-cut closer to the ground and more nearly horizontally thereto, and less stumpage will be left standing, by positioning the saw closer to the ground, than results from the use of the type of portable apparatus in which the circular saw and its driving pulley are supported by and at the end of an elongated practically straight rod or shaft carried by and projected for several feet beyond the forward part of the machine frame, which type of machine requires tilting to great angular inclination for low cutting.

To so construct and off-set certain parts, to obviate the necessity to depress the saw to a considerable angle for low cross-cutting of the standing tree.

To so arrange and dispose the parts of my apparatus, that the saw when turned to a horizontal position may cut the low end of the standing tree and its stump at approximately right angles thereto and nearer to the ground, and save thereby during the felling operation, the necessity for certain purposes, of later re-cutting at the saw mill the large end of the bole, and the labor costs incident to such extra mill work.

To leave flatter topped stumps in the field, instead of sharp-angled ones.

To so off-set and dispose certain parts of my apparatus so that the saw pulley and its shaft will be bisected by a line extending forward through and from the longitudinal axis of the saw supporting and positioning member journaled on the machine frame, regardless of whatsoever angle the saw and its pulley may be turned to.

To produce a more efficient, economical, simple and sturdy type of power operated, hand manipulated portable timber cutting saw apparatus.

To accomplish these results reference is had to the accompanying drawing, in which Fig. 1 is a plan view of the machine showing the off-set saw vertically disposed.

Fig. 2 is a side elevation of Fig. 1, but with the saw disposed in low horizontal position.

Fig. 3 shows a front elevation of the apparatus, with the fore end of the short oscillating shaft in position in the forward journal on the frame.

Fig. 4 is a detail of my off-set saw supporting device.

Fig. 5 is a modified form of my off-set saw supporting device.

Fig. 6 is a somewhat enlarged detail view partly in section, of the locking means for holding my off-set saw in vertical and horizontal position.

Fig. 7 is a detail, on the same scale, of the locking plate of Fig. 6.

Fig. 8 is a side view (enlarged) of Fig. 6.

In the accompanying specification 1 represents a fabricated frame preferably formed of steel pipe of suitable size and lengths welded or otherwise rigidly fastened together as indicated at 2, Fig. 3, or formed of other suitable frame material that may be forged, cast or bent into shape.

To the lower ends of the front portions of said frame portion, spindles 3, 3' are bolted or otherwise secured to receive wheels 4, 4'.

Welded or rigidly secured to said lower ends of the frame at 5, 6, is an angularly and upwardly disposed rear brace, preferably formed of steel pipe, as shown in Fig. 1, the upper portion 9 of which brace parallels the front transverse part 10 of said frame.

Two pairs of matched parallel ordinary motor bed angle irons indicated at 11, 12, and 13, 14, are preferably welded at their extreme ends, or otherwise securely attached, to the parallel rear and front parts 9, 10 of said frame at 15, 16 and 15' and 16' so that a line drawn through their axes will parallel usual motor bed bolts 11', 12' and 13', 14'. Two split bearings or journals 17 and 18 respectively are welded or otherwise rigidly attached to the machine frame at such locations. Said journals are each provided with ordinary adjusting means, such as a bolt 19 (see Fig. 3).

Fitted turnably in said journals is a rod or shaft 20, the forward end of which shaft projects but a very short distance beyond the forward face of the journal 17. At the rear end of said shaft 20, at 20' is welded or otherwise rigidly secured a transversely disposed handle bar $20^2$, for moving and manipulating the machine, and for oscillating the rod or shaft 20 in its journals, and through the off-set angularly extending arm or part hereinafter described, a circular saw supported at the forward end thereof.

As previously stated it is most desirable to be able to saw the tree bole low and as near to the ground as possible to conserve timber and in so doing to reduce the length of the resultant stumpage, and for the same reason to horizontally cross-cut the bolt and stump to obviate the necessity and the cost of labor to thereafter square the timber ends; and to provide a practically straight belt drive from the driving (motor) pulley to the driven (saw) pulley, to conserve power and belt wear, during whichever angle the saw and its pulley may be positioned at.

To accomplish these results I mount a straight rear shaft or part 20 (solid or tubular) in bearings 17, 18. To the fore end of said shaft, adjacent the forward face of the journal 17, I weld or otherwise integrally attach an off-set arm or bracket, which may be comprised of a single rod or tube or portions of either thereof, which may be welded or otherwise securely fastened together, as shown by the angularly disposed part 21 intended to be welded or rigidly attached to the fore end of the shaft 20 at 22. To the part 21 is preferably welded the forwardly extending arm 23 (Figs. 1, 2, and 4) to the forward end of which is welded a saw and pulley arbor housing 24. A thrust washer 25 (Figs. 1 and 2) surrounds and is welded to the shaft 20, just forward of the journal 17, to prevent rearward thrust of the shaft 20 and its aforesaid bracket 21, 23 and the saw assembly parts. Partly in order to insure a straight line belt drive, the axis of the shaft 20 is positioned directly below the middle of the motor (driving) triple belt pulley 47 which shaft is disposed at right angles to the pulley shaft 46. It will be seen that the axis of the off-set long arm 23 is parallel with (although forward of) the axis of the shaft 20 from which it is off-set.

Instead of the off-set parts 21, 23 being formed of welded parts of solid rods or of tubing they may be formed of a single rod or tube bent into the desired off-set shape, or such off-set members or bracket may be fabricated as a forging or casting, indicated at 26, 27 (Fig. 5), which bracket could be welded or otherwise rigidly attached to the forward end of shaft 20.

The words "parallel axis" as used herein, means parallel or approximately so, since a cast or a forged bracket such as 26, 27 may be given some curvature the better to off-set lateral stress, and the cross section thereof may be in the form of a T or I or a channel or other shaped bar, for better rigidity, and to check torsional strain. It is to be understood that the top of the machine frame can be made wider than that shown in Fig. 3, and that by positioning the motor bed and motor, and therefore the motor pulley some inches to the right of its position shown on the machine frame, and also the shaft 20 to a position under said pulley (looking as in Fig. 3 at the front of the machine) it is possible to increase the length of the angularly disposed part 21, by several inches, as indicated by the dotted 21', and so permit the parallel arm 23 to be correspondingly off-set some inches, as indicated at 23' Fig. 4, and correspondingly at 26', 27' (Fig. 5), which additional off-set will permit the saw to occupy a correspondingly lower horizontal position—i. e. nearer the ground—a desideratum being that when the saw occupies a vertical position, it should not project laterally beyond the tire of the wheel adjacent to it, and that the saw pulley shall be correspondingly positioned so as to remain in line with the motor pulley; to meet which conditions, the saw arbor housing and the saw arbor itself may be lengthened the required amount.

Figs. 1 and 2 show the vertical and the horizontal positions of the saw. In the latter position the belts become twisted one-quarter turn between the pulleys; but regardless of whatever angle the saw and its pulley may be turned to, the center of the saw pulley will, in my invention, be in line with the axis of the rear journaled shaft, 20; whereas in the type of machine in which an elongated straight shaft projects well forward of the machine frame and directly supports and positions the saw and its pulley at its forward straight end, the pulley is in line only during the vertical or horizontal position of the saw; since the center of the saw pulley is then off-set from and so does not co-incide with the axis of such elongated shaft, the forward end of which elongated shaft connects directly with the saw assembly housing, thus necessitating the pulley carried thereby to be considerably off-set from the axis of such shaft and quite badly mis-aligned with the motor pulley when the saw is turned, e. g. to a horizontal position, which off-alignment position of the pulleys causes rapid ragging of the driving belt or belts.

In order to arrest and hold the saw with its drive pulley in vertical, horizontal, or other angular position, the journal 18 is provided with radially projecting pins 29, 30 welded thereon at 90 degrees apart (including a pin 29' spaced therebetween) which pins (see Fig. 6) are intended to be engaged by the slot 34 of a spring actuated lock plate 33 fitting slidably in a slot formed between plates 31 and 32, the base of which latter is welded to the shaft 20, said plate 33 having a rod or spline 40 onto which is welded a large washer 41 against the shoulder 42 of said lock plate. Said rod 40 passes slidably through a plate 41x similarly fastened to shaft 20. A coil spring is fitted on said rod between said washer and said plate 41x, the end of said rod being provided with an ordinary handle 44 to facilitate the rearward movement of lock plate 33. A detail side view somewhat enlarged (Fig. 8) shows the transversely disposed plates 31, 32 in which the upper plate 32 is spaced slightly more apart from plate 31 than the thickness of plate 33, to allow sliding clearance to said plate 33. Strips 34 and 35 are welded to the edges of said guide plates 31, 32. Guide plate 36 is of similar construction—the slots formed between the plates 31, 32, and of 36 serving as guides for the lock plate 33. It is understood, however, that such device is shown merely to illustrate an efficient locking means, and that any conventional or efficient locking device may be used for the purposes hereof, to retain the saw assembly at different desired angles.

The term "saw assembly unit" comprises a saw arbor housing 24 transversely disposed and welded or otherwise rigidly attached to the end of an off-set forwardly extending arm 23, an ordinary saw arbor 24', 24², suitable bearings, a saw 24³, and a saw pulley 24⁴, as indicated (except bearings) in Figs. 1 and 2.

As shown in the drawing, one end of such ordinary arbor mounts as at 24', a circular saw 24³ in the usual manner, and the opposite end of said arbor at 24² mounts a belt pulley 24⁴, having preferably triple V grooves as shown for the use of the triple V belts, the center (central V groove) of which pulley is one the line of the axis of the rear journaled shaft 20 (as seen by the projected dotted line 24⁵ in Figs. 1 and 2) which pulley when the saw is in its vertical or most used position, is also in direct line with the center of the triple V belt drive pulley (i. e. of the middle V) attached to the shaft 48 of a gasoline or other drive motor 49 indicated in diagram, the disposition of which pulleys makes possible a constant, approximately straight line drive between them, regardless of the angle to which the saw and its pulley may be turned.

It is to be understood that I make no claim of invention to the structural form itself of the portable vehicle frame or wheels, to the type of motor, the particular saw assembly positioning and locking device, the type of journals or to any particular type of saw arbor and its bearings, or the method of attaching the saw and its pulley to the arbor, neither to the particular type of pulleys shown herein, since other and conventional forms of such features may be used, my invention residing in the special objects and means set forth herein for accomplishing the more efficient and economical results pertaining to and associated with the off-set forwardly extending arm 23 and the constant alignment of the saw arbor pulley with the longitudinal axis of the straight journaled part or shaft 20, thereby permitting a low positioned saw capable of cross-cutting a tree at a more horizontal angle, approximately parallel to the ground, and efficient alignment between the driving and driven pulleys.

A further advantage of my off-set extending arm, is that it gives more rigid support to the saw in that it is possible to attach the end of the arm to the saw housing close to the saw, whereas when a straight elongated shaft is projected to and attached to the saw housing close to the saw, the saw pulley at the opposite end of the saw arbor will then become off-set laterally to an impractical degree from the line of the motor pulley, when the saw is turned to different angular positions—e. g. away from its vertical position.

For clearer illustration, the horizontal part of the machine frame and the motor thereon are shown disposed slightly above the wheels as in Figs. 2 and 3, whereas in practice in order to position the saw in a low plane of operation, especially when it is used horizontally, the top of the machine frame and the motor bed and motor with its pulley, can occupy a somewhat lower position between the wheels than shown, so as to lower the axis of the straight journaled shaft member 20 and the off-set front forwardly extending arm or part 23 positioning member, to approximately that of the dotted line 20x, 21x and 23x, and correspondingly lower the aforesaid motor 49 and its pulley 48. The saw pulley may however be disposed on the arbor $24^2$ at a higher horizontal plane than the position indicated at $24^4$. It is to be understood that conventional belt pulleys and belts (belts shown partly broken away) are intended to be used to drive the saw, and that since such devices are well understood, indications thereof only are shown in the drawing.

The terms "bracket," "forwardly extending arm," and "off-set parallel member," as used herein, are intended to cover any practicable forwardly extending bracket or arm integrally connected with and extending forwardly from a shaft journaled on the machine frame, and sufficiently laterally off-set from said shaft beyond the forward part of the machine frame, to permit a low horizontal position of the saw, comprising the saw assembly unit, and whether formed of straight, angular, curved or bent, solid, tubular, or fabricated material, or formed of one or more integrally connected parts, and permitting the saw pulley to be located into such a position that a line projected longitudinally through (and forward of) the axis of a shaft journaled on the machine under or adjacent the motor pulley, will bisect the saw pulley, regardless of whatever angle said pulley (and saw) may be turned to.

The term "parallel" means parallel or approximately so, or such modified form of the forwardly extending arm as may be suitable for accomplishing the objects hereof.

The term "angular" pertaining to the aforesaid extending arm, covers also curvular forms thereof.

What I therefore claim is:

1. In a portable timber saw apparatus having a circular saw assembly unit with a belt pulley, and a motor with a drive pulley carried by the machine frame and having a belt connecting said pulleys to drive said saw, and means to turn and to retain it at different angles, the combination of a hand-operated saw supporting and positioning member, comprising an elongated straight member and a laterally off-set forwardly extending arm, the straight member being journaled fore and aft on the machine frame and terminating at the front thereof, the said laterally off-set arm comprising an angularly disposed bracket integrally connected at the off-set with the forward end of said elongated straight member, the saw mandrel being disposed transversely of said forwardly extending arm and having the saw and pulley secured thereto, the pulley of said saw assembly unit being so positioned that a line projected forwardly through the longitudinal axis of said elongated straight member will bisect the center of the face of said pulley and intersect the axis of the saw arbor, irrespective of whatever usable angle said saw pulley and saw may be turned to, the said elongated straight member being journaled fore and aft on the machine frame and being positioned under the face of the motor pulley, and transverse to the axis of the motor shaft.

2. In a portable timber cutting saw apparatus having a driven circular saw assembly unit and a motor mounted on the frame to operate the saw of said unit, a saw supporting and positioning means comprising two approximately parallel members spaced a considerable distance apart, an angularly disposed member integrally connecting said parallel members beyond the forward part of said machine frame, one of said parallel members comprising an elongated shaft journaled fore and aft on said frame, and the other parallel member being laterally off-set from said elongated member and supporting the driven circular saw assembly unit at its forward end, comprising a saw, saw arbor, and means to drive said saw by said motor, the center of the driven means on the arbor being disposed approximately in line with the axis of the first parallel member, means to turn said off-set parallel member and thereby oscillate said saw assembly to different angular positions, and means to lock said off-set parallel member and said saw assembly against oscillation.

EDMOND CARLTON McLEAN.